(12) United States Patent
MacLachlan

(10) Patent No.: US 6,439,378 B1
(45) Date of Patent: Aug. 27, 2002

(54) MODULAR CONVEYOR BELT WITH ROLLING HINGE PIN PAIRS

(75) Inventor: Gilbert J MacLachlan, Chalmette, LA (US)

(73) Assignee: The Laitram Corporation, Harahan, LA (US)

( * ) Notice: Subject to any disclaimer, the term of this patent is extended or adjusted under 35 U.S.C. 154(b) by 0 days.

(21) Appl. No.: 09/941,037

(22) Filed: Aug. 28, 2001

(51) Int. Cl.[7] .............................................. B65G 17/06
(52) U.S. Cl. ....................................... 198/850; 198/851
(58) Field of Search ................................ 198/850, 851, 198/852, 853

(56) References Cited

U.S. PATENT DOCUMENTS

| | | |
|---|---|---|
| 3,742,776 A | 7/1973 | Avramidis |
| 3,980,173 A | 9/1976 | Riggs |
| 4,010,656 A | 3/1977 | Jeffrey |
| 4,140,025 A | 2/1979 | Lapeyre |
| 4,507,106 A | 3/1985 | Cole, Jr. |
| 5,105,937 A * | 4/1992 | Gundlach .................. 198/853 |
| 5,125,874 A | 6/1992 | Fryer et al. |
| 5,372,554 A | 12/1994 | Okuda |
| 5,433,313 A * | 7/1995 | Deschner ................ 198/850 X |
| 6,186,921 B1 | 2/2001 | Kotera |

* cited by examiner

Primary Examiner—James R. Bidwell
(74) Attorney, Agent, or Firm—James T. Cronvich

(57) ABSTRACT

A modular conveyor belt forming a hinge between consecutive belt rows hingedly connected by a rolling hinge pin pair. Hinge eyes along the forward and rearward ends of each row of belt modules include aligned openings for the hinge pins. The belt rows are arranged end-to-end with the hinge eyes of adjacent rows interleaved. The hinge pin pairs are inserted side by side in the passageway formed by the aligned openings of the interleaved hinge eyes. The hinge pin pairs include first and second hinge pins having outer contact surfaces. The openings in the hinge eyes are characterized by a narrow end with constraining surfaces for positioning the first hinge pin and flaring out to a wider second end bounded by a roll surface that gives the second hinge pin clearance to roll along the roll surface as the belt articulates. During belt articulation, each hinge pin of the pair rolls against the other and along the roll surfaces instead of sliding against the walls of the openings.

16 Claims, 3 Drawing Sheets

MODULAR CONVEYOR BELT WITH ROLLING HINGE PIN PAIRS

BACKGROUND

The invention relates generally to power-driven modular plastic conveyor belts and, more particularly, to modular plastic conveyor belts hingedly interconnected row to row by pairs of hinge pins.

Conventional modular conveyor belts and chains are constructed of modular links, or belt modules, arranged in rows. Spaced apart hinge eyes extending from each end of the modules include aligned openings. The hinge eyes along one end of a row of modules are interleaved with the hinge eyes of an adjacent row. A single pivot rod, or hinge pin, journalled in the aligned openings of end-to-end connected rows, connects adjacent rows together to form an endless conveyor belt capable of articulating about a drive sprocket or drum.

Because they do not corrode and are easy to clean, modular plastic conveyor belts are often used instead of metal belts. Usually, the hinge pins in plastic belts are also made of plastic. The hinge pins are typically circular in cross section and reside in circular openings in the hinge eyes. Relative rubbing motion, known as scrubbing, between the hinge pins and the walls of the hinge eyes as the belt articulates about sprockets tends to wear both the hinge pin and the hinge eye wall. This wear tends to wallow out the openings in the hinge eyes and increase the pitch of the belt. In abrasive environments, such as in conveying potatoes and other agricultural products, this wear is accelerated by the intrusion of dirt and grit into the hinges of the belt.

Metal hinge pins are sometimes used to increase the wear life of the pins. But that does not do away with the relative motion between pin and hinge eye wall, and belt module wear at the hinge is still a problem.

Non-circular hinge strips made of a flexible material have been proposed to resist wear. Hinge eyes forming slots with flared ends permit the confined hinge strip to flex a limited angle without frictionally rubbing with the hinge eyes as the belt articulates. Such an arrangement is effective in increasing wear life, but the flexible hinge strip is inherently weak in shear strength and unsuitable for carrying heavy loads.

Some power transmission chains constructed of metal components use a pair of pins in each joint between consecutive groups of links. At each joint, one pin is wedged into the openings of one group of links and another pin, in rocking engagement with the first pin, is wedged in the openings of the adjacent group of links. In this way, relative motion is confined to the rocking surfaces of the metal pins. But transmission chains and modular conveyor belts operate in different environments and serve different purposes. Power transmission chains often are used in well-lubricated environments, relatively free of abrasives, as in internal combustion engines and other machinery in which the use of gears is impractical. Modular conveyor belts, on the other hand, are frequently used in very abrasive, non-lubricated environments to move various products over long distances.

Thus, there is a need for a modular plastic conveyor belt that can resist wear at the hinge for a long operating life even in abrasive environments.

SUMMARY

This need and others are satisfied by a modular plastic belt having features of the invention. The belt is formed of a series of rows of belt modules having a conveying surface. Each row includes one or more belt modules extending from a forward end to a rearward end in the direction of belt travel. A first set of hinge eyes is arranged along the forward end, and a second set of hinge eyes is arranged along the rearward end. Aligned openings are formed in the hinge eyes. The rows are arranged end-to-end with the first set of hinge eyes of a row interleaved with the second set of hinge eyes of an adjacent row. The rows are hingedly connected together to form a conveyor belt by a plurality of hinge pin pairs, each of which includes a first hinge pin and a second hinge pin. Each hinge pin further has an outer contact surface. The first and second hinge pins of each pair are arranged side by side in the aligned openings in the interleaved hinge eyes at the ends of each row to connect consecutive rows into a conveyor belt with a hinge between consecutive rows.

In preferred versions of the conveyor belt, the hinge pins are circular in cross-section, preferably of the same diameter, or oval with the same contact surface radius. This reduces the number of unique parts and helps prevent scrubbing.

In other versions, the openings flare out from a narrow end to a wide end and form, for example, a triangular-shaped opening with a vertex at the narrow end and a base at the opposite wide end. In another variation, the openings resemble bicycle seats. The first hinge pins reside in the narrow ends of the openings in the hinge eyes along the forward end of the row, and the second hinge pins reside in the wide ends of the openings in the hinge eyes along the forward end of the row. The narrow end of the opening in the hinge eye forms a constraining portion of the opening to maintain the position of the hinge pin relative to the belt module. The wide end of the opening is bounded by a roll surface along which the hinge pin rolls as the belt articulates. Preferably, the narrow end is the proximal end of the opening and the wide end is the distal end of the opening in the hinge eye. As the belt bends and the rows rotate relative to each other, the outer contact surfaces of the first and second hinge pins roll against each other and along the roll surfaces of the hinge-eye openings instead of rubbing against the hinge eye.

Thus, a conveyor belt embodying features of the invention eliminates relative rubbing contact between hinge pin and belt module, thereby making such a conveyor belt particularly long-lasting in abrasive environments.

DRAWINGS

These and other features, aspects, and advantages of the invention are described in more detail in the following description, appended claims, and accompanying drawings in which:

DETAILED DESCRIPTION

Figure 1:
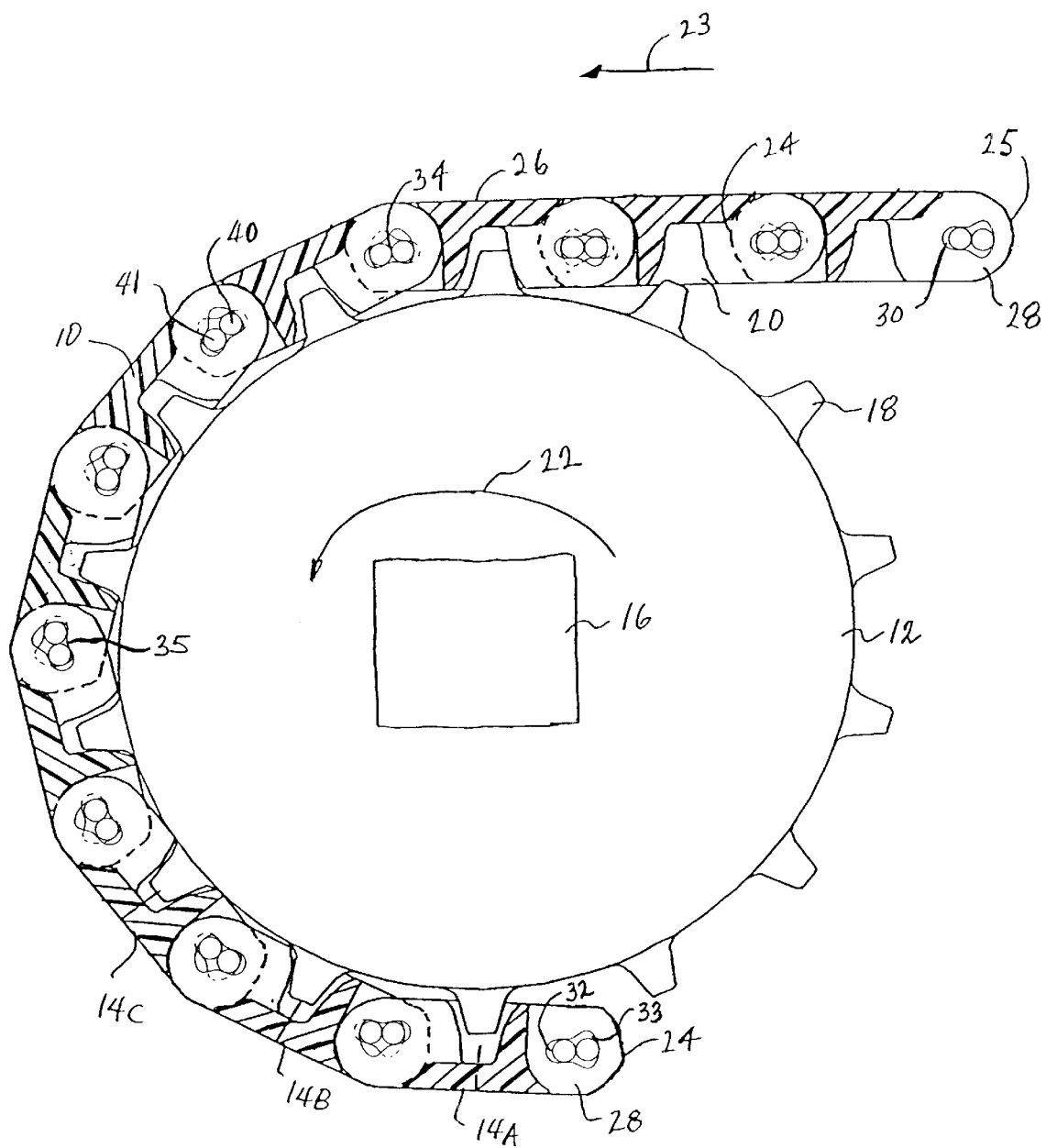
FIG. 1 is a partial side cross-sectional elevation view of a conveyor belt embodying features of the invention, including a bicycle-seat-shaped hinge-eye opening.

A portion of a conveyor belt 10 having features of the invention is shown in FIG. 1 engaged with and articulating about a sprocket 12. The belt is made up of a series of rows, such as the three consecutive rows 14A–C. Each row may consist of a single belt module defining the width of the belt or multiple modules arranged side by side, typically in a brick-lay pattern from row to row, across the width of the belt. Typical modular plastic conveyor belts are manufactured and sold, for example, by Intralox, Inc. of Harahan, La. USA. The belt modules are typically made by injection-molding thermoplastic materials, such as polypropylene, polyethylene, acetal, or composites, to name a few. The sprocket has a central bore 16 for a shaft (not shown), which may be driven by a drive motor (not shown). Teeth 18 on the periphery of the sprocket engage drive surfaces in the belt, such as the walls of drive pockets 20 formed in the underside of the belt. As the sprocket rotates in the direction of curved arrow 22, the belt is driven in a direction of travel indicated by arrow 23. The modules on each row extend in the direction of belt travel from a forward end 24 to a rearward end 25 with a body section in between. The outer sides of the belt modules form a conveying surface 26 on which articles are conveyed. One or more hinge eyes 28 are arranged along the forward and rearward ends of each row. An opening 30 is formed in the hinge eyes. The opening extends from a first end 32 to a second end 33. The opening is narrower at the first end than at the second end. The rows are arranged end-to-end with a first set of hinge eyes along the forward end of a row interleaved with a second set of hinge eyes along the rearward end of an adjacent row. In this arrangement, the openings in the hinge eyes form a continuous passageway between each belt row. A hinge pin pair 34, comprising preferably first and second hinge pins 40, 41, extends through the passageway to form with the interleaved hinge pins a hinge 35 between adjacent rows at which the belt can articulate.

Figure 2:
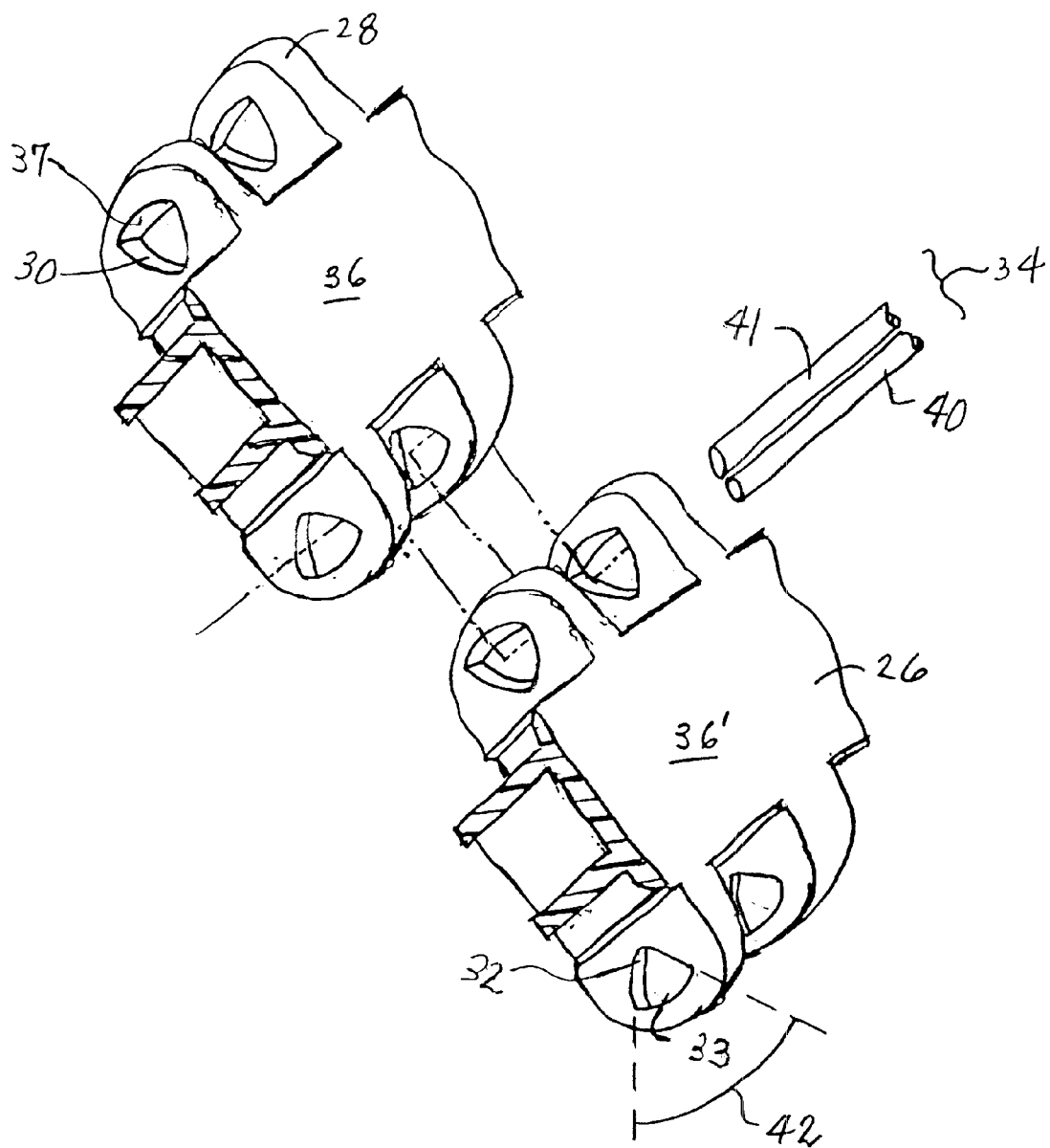
FIG. 2 is a partial exploded cross-sectional isometric view of the hinge region between two adjacent rows of the conveyor belt of FIG. 1, but with a triangular-shaped hinge-eye opening.

The formation of the hinge is shown in FIG. 2 as well. Belt modules 36, 36' from adjacent rows are shown separated for clarity. Each opening 30 flares out from the narrow first end 32 to the wide second end 33. As shown in the example of FIG. 2, the openings are shaped like rounded triangles with a vertex at the first end 32 and a rounded base at the opposite second end 33. In FIG. 1, the openings are shaped like bicycle seats. In all cases, the wide ends of the openings are bounded by a roll surface 37, preferably a convex arcuate surface disposed at the distal end of the openings viewed from the interior of the row. The openings are shown in these examples with an axis of symmetry in the direction of belt travel to allow for equal articulation and backflexing ranges. The hinge pin pair 34 includes the two hinge pins 40, 41, shown in the examples of FIGS. 1 and 2 as circular in cross-section with the same diameter. Other cross sections forming contact surfaces are also possible. The hinge pins may be metal, such as stainless steel, but are preferably molded or extruded of one or more polymeric materials such as polyethylene, polypropylene, acetal, nylon, or composites. The first hinge pin 40 is nested in the narrow end 32 of the openings in the first set of hinge eyes of the module 36'. The second hinge pin 41 resides in the wide end 33 of those openings in the module 36'. Thus, the walls of the narrow, proximal end of the opening form constraining surfaces that position the first hinge pin in the opening relative to the belt module by restricting its freedom of movement, but not its ability to rotate. The wide end, on the other hand, permits the second hinge pin 41 to roll along the roll surface 37 through a range of articulation angles 42 defined by the arc length of the sector. Conversely, the openings in the hinge eyes of the module 36 on the adjacent row position the second hinge pin and provide freedom of articulation and a roll surface to the first hinge pin. In this way, the first hinge pin 40 is retained in position in the narrow end of the openings in the module 36', and the second hinge pin 41 is retained in the narrow end of the openings in the adjacent module 36.

Figure 3:
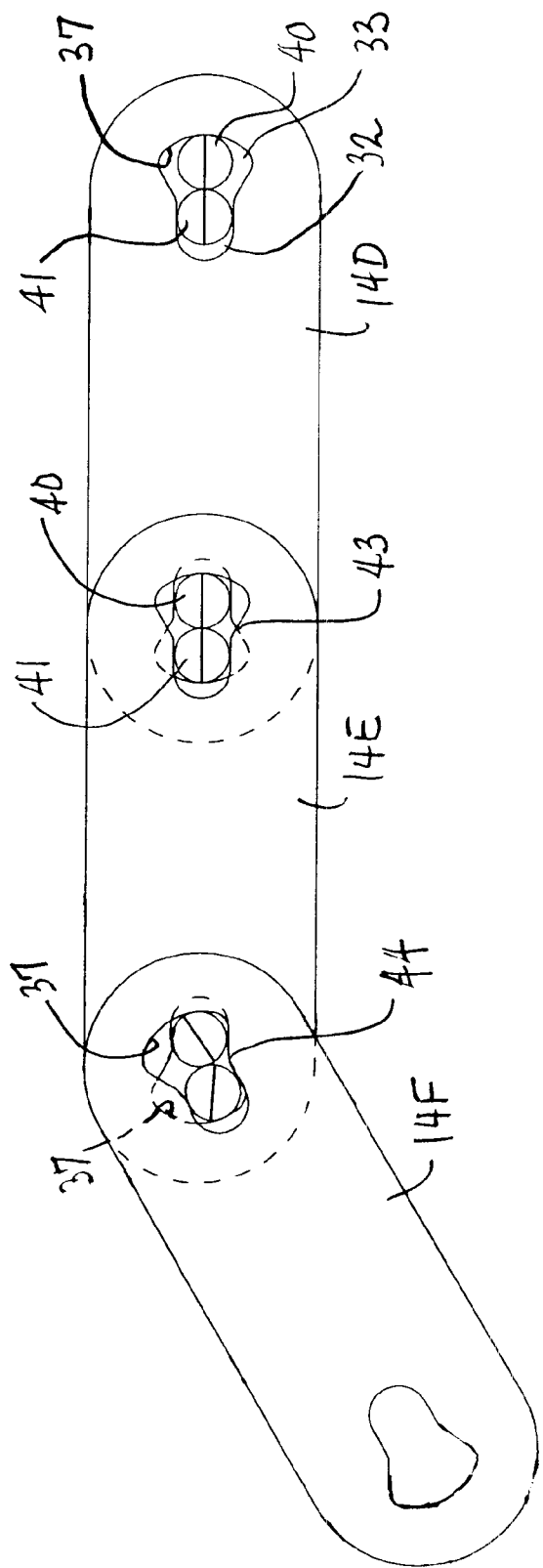
FIG. 3 is a partial side elevation view of three rows of a conveyor belt as in FIG. 1 showing how the hinge pins roll as the belt articulates.

The action of the hinge pin pair is illustrated in FIG. 3. Belt rows 14D and E are shown on a level run; rows 14E and F are shown articulating relative to each other. Belt tension urges the hinge pins 40, 41 toward the roll surfaces 37 at the wide ends 33 of the openings in the respective interleaved hinge eyes with the outer contact surfaces of the two hinge pins in contact with each other and with the roll surfaces of alternate hinge eyes. The narrow ends 32 of the openings maintain the hinge pins in position in the modules, but provide enough clearance for the hinge pins to rotate as the belt articulates. Belt pull, or tension, is transmitted from module row to row through the hinge pin pair. The relative rotational relationship of the two hinge pins is indicated for illustrative purposes by markers in FIG. 3. The markers are both shown horizontal at the hinge 43 between modules 14D and E. As the belt goes around a sprocket, the belt pivots at the hinge 44 between modules 14E and F. As the belt pivots, the pins roll on each other and along the roll surfaces 37 of the openings as the adjacent rows 14E and F pivot at the hinge. As shown by the rotated positions of the markers on the hinge pins in FIG. 3 after articulation about a sprocket, for instance, the hinge pins have rolled on each other along their outer contact surfaces and along the roll surface in the wide ends of the hinge-eye openings. Thus, the sliding motion of conventional single hinge pins against the walls of the hinge eye openings during belt articulation is largely eliminated by the rolling action of the two hinge pins against each other and against the roll surfaces of the hinge eyes. The friction and wear of both hinge pins and belt modules at the hinge is significantly reduced. Consequently, belt and hinge pin life is increased, especially in abrasive environments, by the novel conveyor belt with rolling hinge pin pairs.

Although the invention has been described in detail with respect to a few preferred versions, other versions are possible. For example, the openings need not be symmetrical; the wide end could allow for more rotation in one direction than in the other. The shape of the openings could be other than as shown in the drawings as long as one end provides a positioning function for the pins with constraining surfaces and the other end allows for belt articulation through a range of angles and provides a roll surface for the pins. Instead of being circular, the hinge pins could be oval, for example, with the same outer contact surface radius. Therefore, as these examples suggest, the scope of the claims should not be limited to the description of the preferred versions.

What is claimed is:

1. A modular plastic conveyor belt suitable for abrasive environments, the conveyor belt comprising:

a series of rows of belt modules wherein each row includes at least one belt module extending from a forward end to a rearward end in the direction of belt travel and including a first plurality of hinge eyes along the forward end and a second plurality of hinge eyes along the rearward end, wherein the hinge eyes form aligned openings therethrough, the rows being arranged end to end with the first plurality of hinge eyes of a row interleaved with the second plurality of hinge eyes of an adjacent row; and a plurality of hinge pin pairs, each of the pairs including first and second hinge pins with outer contact surfaces, wherein the first and second hinge pins of each pair are arranged side by side in the openings in the interleaved hinge eyes at the ends of each row to connect consecutive rows into a conveyor belt having a hinge between consecutive rows.

2. A modular conveyor belt as in claim 1 wherein the first hinge pin and the second hinge pin are circular in cross section.

3. A modular plastic conveyor belt as in claim 2 wherein the first hinge pin and the second hinge pin have the same diameter.

4. A modular conveyor belt as in claim 1 wherein the first hinge pin and the second hinge pin have the same outer contact surface radius.

5. A modular conveyor belt as in claim 1 wherein the outer contact surfaces of the first and second hinge pins roll against each other as the belt articulates at the hinge.

6. A modular conveyor belt as in claim 1 wherein the openings are triangular-shaped.

7. A modular conveyor belt as in claim 6 wherein the triangular-shaped openings include a vertex defining the narrow end and a rounded base defining the wide end.

8. A modular conveyor belt as in claim 1 wherein the openings are bicycle-seat-shaped.

9. A modular conveyor belt as in claim 1 wherein the openings flare out from a narrow end to a wide end.

10. A modular conveyor belt as in claim 9 wherein the narrow end of the openings includes a constraining surface that restricts the motion of the hinge pins to maintain their position.

11. A modular conveyor belt as in claim 9 wherein the wide end of the openings is bounded by a roll surface along which the hinge pins can roll.

12. A modular conveyor belt as in claim 9 wherein the first hinge pin resides in the narrow end of the openings in the hinge eyes along the forward end of a row and the second hinge pin resides in the wide end of the openings in the hinge eyes along the forward end of the row.

13. A modular plastic conveyor belt comprising:

a series of rows of belt modules wherein each row includes at least one belt module extending from a forward end to a rearward end in the direction of belt travel and including a first plurality of hinge eyes along the forward end and a second plurality of hinge eyes along the rearward end, wherein the hinge eyes form aligned openings therethrough, the rows being arranged end to end with the first plurality of hinge eyes of a row interleaved with the second plurality of hinge eyes of an adjacent row; and first and second hinge pins extending through the aligned openings to connect adjacent pivotally together, wherein the hinge eyes include a constraining surface at one end of the opening and a roll surface bounding the other end of the opening, the constraining surface serving to position the hinge pins relative to the module rows as the hinge pins roll along the roll surface and against each other as the belt articulates.

14. A modular plastic conveyor belt as in claim 13 wherein the roll surface forms the distal end of the opening in the hinge eyes and the constraining surfaces are disposed toward the proximal end of the openings.

15. A modular plastic conveyor belt as in claim 13 wherein the first and second hinge pins are circular in cross section.

16. A modular plastic conveyor belt as in claim 13 wherein the openings are bicycle-seat-shaped.

* * * * *

UNITED STATES PATENT AND TRADEMARK OFFICE
CERTIFICATE OF CORRECTION

PATENT NO.    : 6,439,378 B1
DATED         : August 27, 2002
INVENTOR(S)   : Gilbert J. MacLachlan It is certified that error appears in the above-identified patent and that said Letters Patent is hereby corrected as shown below:

<u>Column 6,</u>
Line 17, insert -- rows -- between "adjacent" and "pivotally"

Signed and Sealed this

Fifth Day of November, 2002

Attest:

Attesting Officer

JAMES E. ROGAN
*Director of the United States Patent and Trademark Office*